June 9, 1936. J. M. CHRISTMAN 2,043,317
SHOCK ABSORBER
Filed Jan. 19, 1932

Inventor
JOHN M. CHRISTMAN
By Milton Tibbetts
Attorney

Patented June 9, 1936

2,043,317

UNITED STATES PATENT OFFICE 2,043,317

SHOCK ABSORBER

John M. Christman, Detroit, Mich., assignor to Packard Motor Car Company, Detroit, Mich., a corporation of Michigan Application January 19, 1932, Serial No. 587,539

11 Claims. (Cl. 267—8)

This invention relates to motor vehicles and more particularly to shock absorbers therefor.

It is an object of the invention to provide a hydraulic shock absorber of the piston type in which there will be little or no loss of fluid pressure due to wear of the pistons and the chamber walls.

Another object of the invention is to provide a hydraulic shock absorber of the piston type in which pressure losses in the piston chambers due to wear of the parts are compensated for.

A further object of this invention is to provide a hydraulic shock absorber with improved fluid flow controlling mechanism.

Still another object of the invention is to provide an improved hydraulic shock absorber of the double acting piston type which may be economically manufactured both as regards its parts and their assembly.

Figure 1:
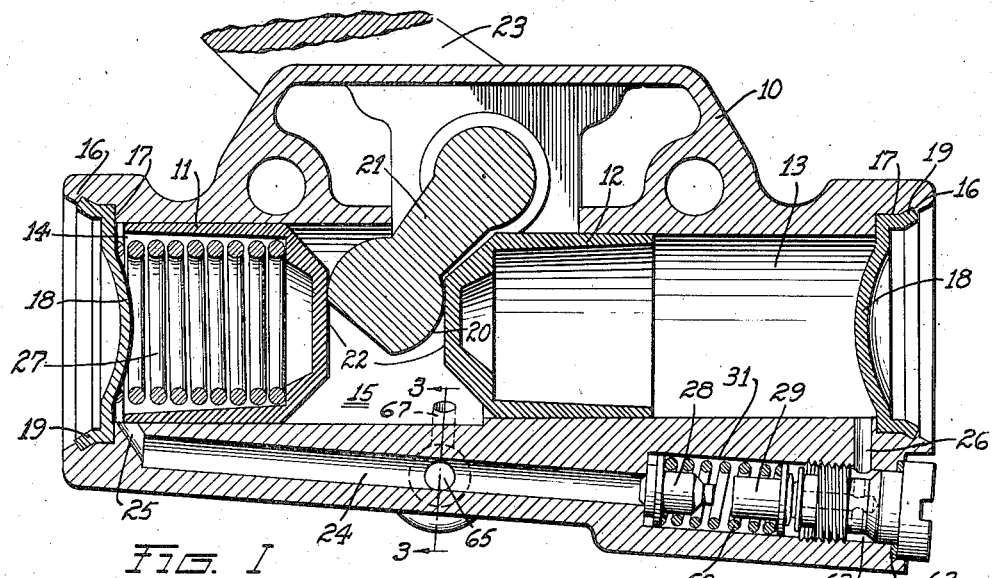
Figure 2:
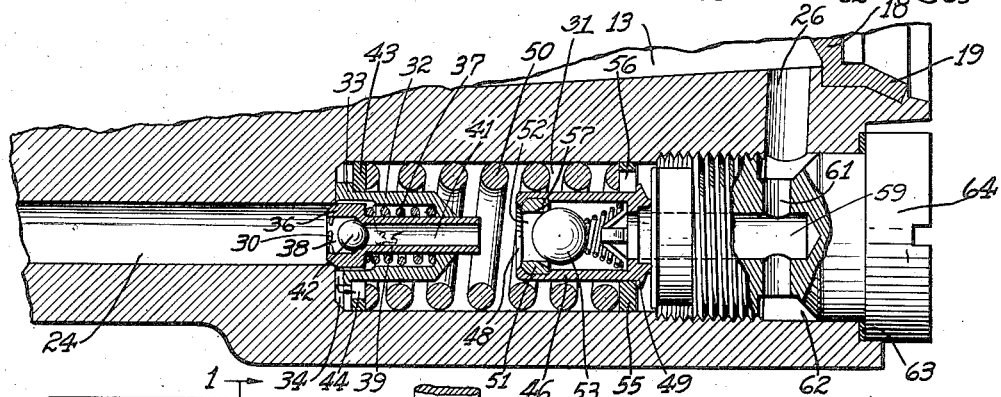
Figure 3:
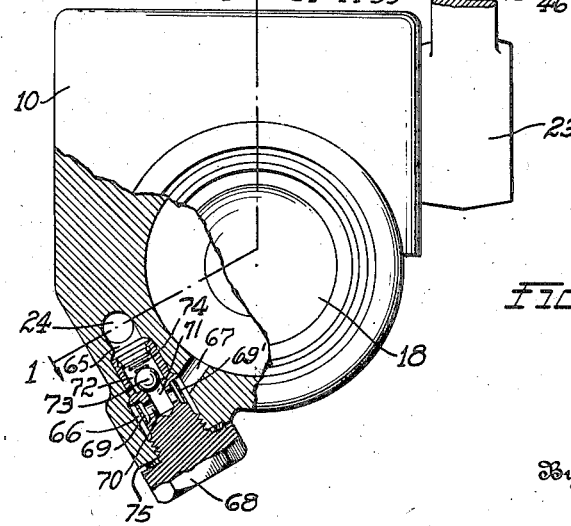

These and other objects of the present invention will become apparent from a reading of the following description taken in connection with the accompanying drawing which forms a part of this specification, and in which:

Fig. 1 is a longitudinal sectional view of a shock absorber taken substantially on the line 1—1 of Fig. 3, Fig. 2 is an enlarged fragmentary sectional view of the flow controlling valves which are positioned in the connecting passage-way between the piston chambers; and Fig. 3 is an end elevational view of a shock absorber embodying the present invention with a portion thereof broken away and shown in section, the sectional view being taken substantially on the line 3—3 of Fig. 1 showing the connecting chamber between the fluid reservoir and the passage-way and the fluid flow controlling valve positioned therein.

Referring to the drawing, reference numeral 10 indicates the casing member of a hydraulic shock absorber. The casing is formed interiorly thereof with a hollow cylindrical chamber extending the full length of the casing. The casing member adjacent its ends is provided with lip portions 16 and shoulder portions 17 to receive caps or closure members 18 which fit tightly within the casing walls to form a closed liquid-tight chamber. These closure members are formed with an upturned flange 19 and are adapted to be inserted in the open ends of the cylindrical chamber and to rest on the shoulders 17, formed in the casing walls. The upturned portions 19 of the caps may then be spun in under the lips 16 by any suitable well-known spinning tool.

A pair of reciprocating pistons 11 and 12 are positioned for reciprocatory movement within the cylindrical chamber and form three separate chambers therein, the piston 12 forming a rebound chamber 13 in one end of the casing and the piston 11 forming a compression chamber 14 in the opposite end thereof. The pistons are oppositely disposed and spaced from each other forming a fluid reservoir 15 between the adjacent ends thereof. The reservoir may be provided with a suitable removable closure member, not shown, for the purpose of filling the shock absorber with fluid.

The pistons are designed to be reciprocated within the casing to compress the fluid between the closure members 18 and the pistons themselves. For this purpose a lever 21 is provided which is formed with semi-spherical bearing surfaces 20 to contact the outer bearing faces 22 of the piston heads. The lever 21 extends through the casing wall and is secured to an operating arm 23 which extends perpendicularly therefrom and which in turn may be secured to a moving part of the motor vehicle such as a spring mounted axle which moves relatively to the vehicle frame members. It will be understood that upon movement of the arm 23, the pistons 11 and 12 will be reciprocated within the chamber to alternately create pressure against the fluid in their respective working chambers 13 and 14.

The casing is provided with a longitudinally extending two diameter passage-way 24 spaced from the cylindrical chamber and connected at each of its ends by ducts 25 and 26 to the working chambers 13 and 14 respectively. As the fluid pressure develops in the chamber 14 by movement of the piston 11, the fluid will move out of the chamber through duct 25 and passage-way 24 to duct 26 and the rebound chamber 13. Upon movement of the lever 21 in the opposite direction, the piston 12 will create pressure in its working chamber 13, forcing the fluid through duct 26, passage-way 24 and duct 25 to the compression chamber 14.

As pointed out, it is one of the objects of the present invention to provide a shock absorber which may be more economically manufactured than those of a similar type now on the market. With this object in view, the portion of the casing containing the piston 12 and the rebound chamber 13 is formed so that the rebound chamber 13 is smaller in diameter than the compression chamber 14 and likewise the piston 12 is of less diameter than the piston 11. This feature is shown slightly enlarged in Fig. 1 but as actually manufactured the difference in the size of these elements is very small. Because the fluid capacity of the rebound chamber 13 and the inside of the piston 12 is less than that of the compression chamber 14 and the piston 11, when the piston 11 is moved to force the fluid through the passage-way 24 into the rebound chamber the piston 12 will be returned to its original retracted position as shown in Fig. 1 without the aid of any separate retracting means. The piston 12 and chamber 13 being of less capacity than the chamber 14 and piston 11, the fluid forced into the chamber 14 by the pressure created by the piston 12 on the rebound stroke will not be sufficient to completely return the piston 11 to its retracted position and it is therefore desirable to provide a compression spring 27 which is seated on the closure member 18 and bears against the head of the piston 11 on the inside thereof, so that this piston is yieldably or resiliently urged to its retracted position at all times. By this particular construction, it will be seen that it is unnecessary to provide a spring for the piston 12 thus eliminating a manufacturing cost which has heretofore been necessary.

It is desirable that the fluid flow between the piston chambers through the connecting passageway 24 be controlled to provide the necessary fluid pressure resistance to the piston movements conducive to a comfortable ride under varying conditions of road travel. To this end fluid flow controlling valve mechanisms 28 and 29 are positioned in a chamber 31 which is the larger diameter portion of the passage-way 24. The wall forming the junction between the two diameter portions of the passageway provides a seat for the valve 28. The valve 28 controls the fluid flow from the compression chamber 14 into the rebound chamber 13, and the valve 29 likewise controls the fluid flow from the rebound chamber 13 into the compression chamber 14. It has been found desirable to provide a greater restriction to the fluid flow between the piston chambers during the rebound stroke of the shock absorber than during the compression stroke. The valves 28 and 29 therefore differ in their construction.

The valve 28 comprises a cylindrical housing 32 having a radially extending flanged portion 33 on its forward or upper face. The flanged portion 33 is provided with radially extending slots 34, the object of which will later appear. The housing 32 is hollow, open at both ends, and has a shoulder portion 35 therewithin adjacent the forward end thereof. A tapered piston valve 36 is seated within the open mouth of the housing 32, said valve being limited in its movement in one direction by the shoulder portion 35 in the housing. This piston valve is formed to entirely close the opening at the junction between the passage-way 24 and the chamber 31 and is maintained in such position by a compression spring 37 which bears against a shoulder portion of the head thereof and against the inner or lower end of the housing 32. This piston valve 36 is provided with a mouth 38 and a shank portion 39 extending from the head 36 entirely through the housing 32 and out the lower end thereof and is provided with an opening or passage-way 41 therethough which connects the mouth 38 with the interior of the valve chamber 31. Closing this passage-way 41 against fluid flowing into the valve chamber 31 from the passageway 24 through the mouth 38 of the piston valve, is a ball valve 42 which seats over the opening of the passage-way 41 so that fluid may only flow out of the chamber through this passage-way and not into the chamber. Suitable means such as small projections 30 may be provided within the mouth 38 of the piston valve to prevent the ball 42 from falling out when the fluid is flowing through the passage-way 41. A circular collar member 43 having a plurality of arcuate openings 44 encircles the housing 32 and bears against the flanged portion 33 thereof, its peripheral surface contacting the cylindrical inner walls of the valve chamber 31. Fluid flowing from the compression chamber 14, due to the compression of the piston 11, will flow through duct 25, passage-way 24, and strike the face 36 of the piston valve, forcing it inwardly of the housing 32 and the chamber 31 against the compression of the spring 37 allowing a limited or restricted flow of fluid to flow through the radial slot 34 formed in the flanged portion 33. The fluid will then flow through the arcuate openings 44 in the collar 43 and thence into the valve chamber 31. Upon a sudden or severe shock, the piston 11 will be moved in a pressure creating direction more rapidly into its working chamber 14 and thereby place a greater pressure on the fluid therein forcing it against the valve mechanism with greater pressure. Upon such increase in pressure, the entire housing 32 will move to the right or inwardly of the chamber 31, allowing an increased flow of fluid to enter the chamber 31 around the flange 33 and through all of the arcuate openings 44 in the collar 43.

A similar valve for controlling the fluid flow from the rebound chamber 13 through the passage-way 24 to the compression chamber 14 is provided. This valve comprises a cylindrical housing 46 having a mouth or opening 47 and an opening 48 in the opposite end thereof. The forward end of the housing 46 or the portion adjacent the opening 47 is provided with a flanged portion 49, the end of which forms a valve, and a collar 55, similar to the collar 43 of the other valve mechanism, is provided which bears against the flange 49 and has arcuate openings 56 therein similar to the openings 44 in the collar 43. An annular valve seat member 51 is provided interiorly of the housing adjacent the lower end thereof and adjacent the opening 48. This valve seat member has a central circular opening 52 formed therein which is closed by a ball valve 53 which in turn is forced to seat thereon under the pressure of a spring 54 seated against the upper portion of the housing 46. It will be seen that fluid moved into the housing 46 under pressure, due to pressure created by the piston 12 in the chamber 13, will move the housing downwardly allowing fluid to flow through the arcuate openings 56 in the collar 55 into the chamber 31. It will also be apparent that this valve presents a somewhat greater restriction to the flow of fluid therethrough than the valve 32. A compression spring 59 is positioned in the valve chamber 31 and bears against the collars 43 and 55 of the respective valve mechanisms so that the valves are normally urged to their closed position and may be opened only by an increase in pressure of the fluid passing through the passageway 24.

In shock absorbers of conventional design, the pistons and the working chambers become worn due to the continued reciprocatory movements of the pistons. When the parts thus become worn, the fluid will be allowed to flow between the walls of the piston and the walls of its working chamber, so that a loss in fluid pressure results. The present invention provides means for compensating for this loss of pressure so that there is no noticeable effect upon the operation of the shock absorbers. This result is accomplished in the present construction by the provision of small orifices or openings 57 in the valve seat member 51 closely adjacent the central opening 52 and the seat portion thereof on which the ball valve 53 rests when in closed position. These orifices permit a limited flow of fluid in both directions around the ball valve 53 so that a small restricted quantity of fluid is permitted to flow through this valve member at all times. When the pistons fit tightly in their respective chambers, this small flow of fluid is just sufficient to allow the proper action of the shock absorber, but at approximately the same time as the pistons become worn so that they allow some of the fluid in their chambers to escape into the reservoir, these small orifices or openings will become closed so that the loss of pressure in the piston chambers is compensated for by the increased resistance of the flow of fluid through the valve mechanism. The closure of the orifices is brought about by the continued opening and closing of the ball valve 53 which ultimately wears the corners of the valve seat member 51 until the ball valve completely closes the orifices, shutting off the free flow of fluid therethrough. By the closure of these orifices, no fluid will be permitted to pass the valve mechanism 46 unless the pressure is great enough to overcome the force created by the springs and the entire housing 46 is thereby moved. It will be seen then that at approximately the same time as the pistons become worn and allow a loss of pressure in the piston chambers, the ball valve seat member 51 will also become worn so that the small flow of fluid through the orifices 57 is completely cut off, thus compensating for such loss of compression in the piston chambers. The above construction materially lengthens the useful life of a shock absorber.

It will be seen that the valve chamber 31 is open at one end to the outside of the casing. A removable closure member in the form of a screw threaded plug is positioned within the end of this opening to maintain the valves in proper position, to permit easy removability thereof and to compress the spring 50. This closure member is formed with an axially extending passage-way 59 opening into the chamber 31 at one end and is provided with radially extending passage-ways 61 connecting this axial passage-way with an annular peripheral slot 62 formed in the closure plug. The end portion 47 of the member 46 engages the inner end of the plug and surrounds the end of the passage 59 and it is normally retained in such position by the spring 50. When the plug is in position within the opening, the annular slot is adapted to coincide with the passage-way 26 formed in the casing and which connects the passage-way 24 with the rebound chamber 13. Suitable packing 63 may be provided between the head 64 of the closure plug and the valve casing thus forming a liquid-tight seal. By the provision of this closure plug, it will be seen that the valve mechanisms may be easily removed for repair or replacement.

It is necessary that the piston chambers 13 and 14 and the passage-way 24 be maintained substantially filled with fluid at all times for the most efficient operation of the shock absorber. This invention provides means for automatically filling the chambers and the passage-way from the reservoir when the fluid therein becomes low. By reference to Figs. 1 and 3, it will seen that a port 65 communicates with the connecting passage-way 24 substantially midway thereof. This port 65 opens into an enlarged chamber 66 formed in the valve casing and a passage-way 67 connects the chamber 66 with the lower interior of the reservoir portion of the casing. A suitable removable valve plug member 68 is screw-threaded into the valve chamber 66 and is provided with an annular peripheral groove 69 which is surrounded by a screen 69'. Radially extending passage-ways 70 connect this peripheral groove with the interior of the valve plug which is provided with an axial bore 71 terminating in a chamber 72. A ball valve 73 is seated over the axial bore 71 in the chamber 72 and is yieldably urged into closed position by a spring 74 which bears against the ball valve 73 at one end and against the upper portion of the interior of the valve plug 68 at its other end. The valve plug may be provided with suitable packing 75 to insure a liquid-tight seal around the valve chamber. From this construction it will be apparent that as the fluid in the passage-way 24 becomes low it will be replaced by fluid flowing from the reservoir 15 through passage-way 67 in the casing, the axial bore 71 of the valve plug, past the ball valve 73, and through the port 65, into the connecting passage-way 24. It will be understood that the ball 73 provides a one-way valve preventing fluid from returning to the reservoir from the passage-way 24.

From the foregoing description it will be seen that when the arm 23 is moved downwardly due to relative movement of the vehicle body and the axle, the lever 21 will be moved to the left thereby moving the piston 11 in a direction compressing the spring 27 and forcing the liquid in the chamber 14 into the passage-way 24. If the force imparted to the lever 21 is slight, the pressure exerted on the face of the piston valve 36 will also be slight and this valve will, therefore, open only slightly to allow a small amount of fluid to pass through the radial slot 34 in the flange thereof and then through the arcuate slots 44 in the collar 43 into the chamber 31. If the force imparted to the lever 21 is great, the piston will force the liquid into the passage-way 24 under a higher pressure against the valve mechanism. This greater pressure will unseat the housing 32 against the action of the large spring 50 thereby allowing a greater amount of fluid to pass into the casing 31. The fluid under pressure in the chamber 31 will unseat the ball valve 53 of the valve mechanism 46 forcing fluid from the chamber 31 into the passage-ways 59, 61, and 26 and the rebound chamber 13. The fluid thus forced into the rebound chamber 13 will return the piston 12 to its original retracted position. Upon the rebound stroke of the shock absorber, the lever 23 will be moved downwardly moving the lever 21 to the right thus forcing the piston 12 to the right, thus creating pressure against the fluid in the chamber 13 and forcing it through the passage-way 26 and the passage-way 59 in the closure plug into the interior of the housing 46. If the rebound is only slight, the orifices 57 in the valve seat member 51 will allow enough fluid to flow therethrough into the chamber 31 to take care of this rebound. However, should the rebound shock be relatively large, the pressure of the fluid on the flanged valve head portion 49 of the housing 46 will unseat the housing, against the pressure of the spring 50, allowing fluid to flow through the openings 56 in the collar 55 into the casing 31. The fluid will flow from the casing 31 through the passage-way 41 in the piston valve and unseat the ball valve 42 so that it flows through the piston head into the passage-way 24 and thence through duct 25 into the compression chamber 14. Should the pistons become worn and the valve seat member 51 also be worn, the ball valve as above explained will close the orifices 57 and the fluid then flowing from the chamber 13 must unseat the valve 49 of the housing 46.

From the foregoing it will be seen that by the present invention a shock absorber has been provided which is extremely economical to manufacture and which embodies novel features tending to produce a very simple and efficient device for the purposes intended.

While only one specific embodiment has been shown and described, it will be apparent to those skilled in the art that the invention is susceptible of numerous changes in construction and design without departing from the spirit or scope thereof. The invention, therefore, is to be limited only by the scope of the appended claims.

Having thus described the invention, what is claimed and desired to be secured by Letters Patent is:

1. In a hydraulic shock absorber, a casing forming fluid containing connecting working chambers, a pair of pistons in the working chambers, said pistons having different displacement relatively, means for moving the pistons to create pressure against the fluid in the chambers, and spring means retracting the piston of larger displacement, the hydraulic pressure developed by the piston having the larger displacement retracting the other of said pistons.

2. In a hydraulic shock absorber, a casing formed with a fluid containing chamber and a passage-way connecting the remote ends thereof, oppositely disposed pistons having different displacement relatively in the chamber forming working chambers, means for moving the pistons to force the fluid from one working chamber through the passage-way to the other working chamber, and spring means urging one of said pistons toward its retracted position, the other of said pistons being returned to its retracted position solely by the hydraulic pressure exerted thereon by the movement of the piston of larger displacement.

3. In a hydraulic shock absorber, a casing forming a chamber and a passage-way connecting the remote ends thereof, a pair of pistons in the chamber forming working chambers therefor, said pistons being of different sizes, the larger one constituting the compression piston and the smaller one constituting the rebound piston, a compound pressure relief valve mechanism for each working chamber positioned in the passage-way, each of said valve mechanisms restricting the initial flow of fluid from its respective working chamber and establishing a less restricted flow into its working chamber, the valve for the compression piston chamber establishing a less restricted flow therefrom than the valve for the rebound chamber, and yieldable means urging the compression piston toward its retracted position, said rebound piston being returned to its retracted position by the hydraulic pressure exerted thereon through the passage-way and the valve mechanisms caused by the pressure created by the compression piston.

4. In a hydraulic shock absorber having a two diameter passage-way therein forming a seat, a valve mechanism in the passage-way for controlling the fluid flow therethrough comprising a cylindrical housing having a flanged portion provided with a radially disposed slot and engaging the seat, a piston valve engaging the valve seat having an axially disposed passage-way therethrough, said piston valve reciprocably telescoping within the housing and extending therethrough, a one-way valve in the piston valve passage-way, a spring between the housing and the piston valve to yieldably force the piston valve into engagement with the valve seat, a collar encircling the housing in abutting relation to the flanged portion thereof and having openings therethrough, and a spring engaging the collar for yieldably maintaining the housing against the seat in the passage-way.

5. In a hydraulic shock absorber having a two diameter passage-way therein forming a seat, a compound valve mechanism in the passage-way comprising a movable housing, a piston valve in the housing, said piston valve and the housing permitting variable quantities of fluid to pass into the passage-way in one direction under different pressure conditions, and a one-way valve in the piston valve permitting a less restricted movement of the fluid therethrough in the opposite direction from that permitted by the piston valve and the housing.

6. In a hydraulic shock absorber having a two diameter passage-way therein forming a seat, a compound valve mechanism in the passage-way comprising a movable housing providing a valve adapted to make and break fluid communication within the passage-way, said housing being provided with orifices permitting a restricted flow of fluid therethrough, said housing and the orifices permitting variable quantities of fluid to pass through the passage-way in one direction under different pressure conditions, a one-way valve within the housing permitting a less restricted movement of the fluid therethrough in the opposite direction from that permitted by the housing and the orifices.

7. In a hydraulic shock absorber, a casing having a bore therein forming a plurality of aligned cylinders of unequal diameters and a connection between the cylinders, a piston fitted to reciprocate in each of said cylinders, and mechanism for maintaining said pistons in fixed spaced relationship including means for moving the pistons to create pressure on the fluid in the chambers and resilient means retracting one of said pistons, hydraulic pressure developed in the larger diameter cylinder flowing through the connection retracting the other of said pistons.

8. In a hydraulic shock absorber having a casing with a passage-way extending therein and open to the exterior at one end, a pair of valve members in the passage-way adjacent the open end thereof, spring means intermediate the valve members, and a removable plug in the open end of said passage-way having an axial bore, an annular groove, and a transverse bore connecting the annular groove with the axial bore, said removable plug being adjustable relative to one of the valves to regulate the tension of said spring.

9. In a hydraulic shock absorber having a casing forming connected working fluid containing chambers in which opposed pistons reciprocate, a valve structure in the connection comprising a member formed with a serrated valve receiving edge, and a valve member engageable with said edge, said valve and seat member being of different hardness such that the valve member will wear the serrated edge of the seat member down to a continuous line, such wear being commensurate with the wear between the engaging surfaces of the pistons and the casing.

10. In a hydraulic shock absorber, a casing having a passage-way therein connecting working chambers and a wall in the by-pass forming a valve seat, valve mechanism in the passage-way for controlling fluid flow therethrough comprising a hollow cylindrical housing having a flanged end portion forming a valve adapted to engage the seat in the passage-way, an annular member within the housing forming a second valve seat, said annular member having a central opening therethrough, a spring pressed one-way valve seated on said annular member and covering the central opening therethrough, a collar encircling the housing in abutting relation to the flanged portion thereof and having openings extending therethrough, and a spring bearing against the collar to yieldably urge the housing and the valve formed thereon into engagement with the valve seat in the passage-way.

11. In a hydraulic shock absorber, a casing forming two fluid containing working chambers of different diameters, pistons reciprocable in said chambers, said pistons being of different diameters to slidably engage with the walls of their respective chambers, means for moving said pistons in opposite directions against the fluid in said chambers, said means being unattached to said pistons, a connection between the chambers through which fluid is moved in opposite directions under pressure of the pistons, and mechanical means associated to assist in retracting the larger diameter piston, the hydraulic pressure developed by the larger piston being sufficient to retract the smaller diameter piston.

JOHN M. CHRISTMAN.